INVENTOR
C. W. LUNDGREN, JR.
BY David L. Hurewitz
ATTORNEY

Dec. 12, 1972 C. W. LUNDGREN, JR 3,706,037

COMMUNICATION SATELITE SYSTEM

Filed Feb. 25, 1970 5 Sheets-Sheet 2

COMMUNICATION SATELITE SYSTEM

Filed Feb. 25, 1970 5 Sheets-Sheet 3

United States Patent Office 3,706,037
Patented Dec. 12, 1972

3,706,037
COMMUNICATION SATELLITE SYSTEM

Carl William Lundgren, Jr., Colts Neck, N.Y., assignor to Bell Telephone Laboratories, Incorporated, Murray Hill, N.J.

Filed Feb. 25, 1970, Ser. No. 14,097
Int. Cl. H04b 7/14
U.S. Cl. 325—4 10 Claims

ABSTRACT OF THE DISCLOSURE

Sun-dependent service interruptions plaguing geostationary communication satellite systems are avoided throughout the year by a system utilizing sun-synchronized space diversity satellites in near-geostationary orbits stabilized with respect to the stars. Two satellites are placed in precisely oriented inclined earth-synchronous circular orbits and a prescribed separation of the mean longitudes of the resultant sidereal figure 8 patterns combined with a precise opposite phasing of the satellites in their respective orbits results in a system in which the two satellites exhibit neither concurrent nor serial outages over the particular geographic zone to be serviced. Earth terminals require only 24-hour sidereal cyclic cam drives for proper antenna pointing and slow diversity switching at infrequent noncritical times.

BACKGROUND OF THE INVENTION

This invention relates to satellite communication systems, and more particularly, to diversity systems for economically providing continuous high-quality service to a specific region on the earth.

Existing commercial communication systems utilize satellites in geostationary orbits; i.e., each satellite is in a circular orbit in the equatorial plane and has a peroid of revolution equal to the earth's period of rotation. The satellite therefore appears stationary over a point on the equator. This minimizes apparent satellite variations, making extensive earth antenna tracking capability unnecessary, but such geostationary systems are fraught with predictable sun-transit and eclipse events.

Sun-transit service interruptions occur whenever the pointing angle from a receiving earth terminal to a desired satellite and the pointing angle from the terminal to the sun so nearly coincide that the additional down path thermal noise power received from the sun renders transmission unusable. Conversely, interruptions of a satellite's solar primary power and sunlight-dependent heat balance occur during eclipse when it passes through the earth's shadow.

Sun-transits and eclipses of geostationary satellites occur during the spring and fall seasons, the exact dates of the former depending primarily upon the latitude of the receiving earth terminal. For terminals or observers located along the equator, both phenomena occur symmetrically in time about the equinoxes when the sun's rays lie in the equatorial plane. While several of the calendar dates for sun-transit and eclipse events associated with a given satellite may coincide, these events are separated by approximately 12 hours since the sun-transit occurs during daylight when the sun is behind the satellite and the eclipse takes place at night when the sun and satellite are on opposite sides of the earth.

Because of the imposed synchronism between earth rotation and satellite revolution, each affected geographical area or sun-dependent outage region is approximately centered at the satellite's shadow on the earth and appears to move, traversing the contiguous United States from west-to-east, coast-to-coast in approximately one-half hour, near noon of the time zone of the satellite's mean longitude. Every earth terminal in the United States can expect sun-transit service interruptions for several consecutive days in the spring and again in the fall, each lasting several minutes.

Dimensions of the sun-transit outage region and the duration of the outage depend upon the earth antenna beam patterns, the design value of the receiving system thermal noise temperature, the solar noise temperature profile, and the allowable service degradation. The outage region is approximately elliptical, elongated north-south, and for conventional earth terminals is typically measured in hundreds of statute miles.

Similarly, eclipses of a geostationary satellite in a system serving the continental United States can be expected for about 90 evenings during the year in the spring and the fall, each lasting up to 70 minutes. Low capacity satellites may be provided with batteries to prevent circuit outages during eclipses. However, batteries are among the least reliable spacecraft components and concomitant voltage and temperature fluctuations and possible related ground command activities contribute to an increased likelihood of satellite failure or a reduction in transmission capacity. Large satellites may be designed for high reliability without battery back-up, but eclipses must then be treated as outages.

Since sun-dependent events (sun-transits and eclipses) are functions of the sun's declination, or north-south angular displacement of the sun's rays from the equatorial plane, such an event observed at any given earth terminal for one geostationary satellite will occur for all geostationary satellites at the terminal during that 24-hour day. These successive sun-transits or eclipses occurring in a single day for two or more satellites in a system are each defined herein as a serial sun-dependent event. Thus, for a two-satellite geostationary system, there will be two serial outage regions, one for each satellite, moving west to east separated by a time interval depending upon the orbit spacing between the satellites—closer satellite spacing providing more rapid succession of the serial events. The first outage region will affect those terminals which are receiving signals from the easternmost satellite, while the following outage region will affect those terminals which are receiving signals from the westernmost satellite.

To minimize interruptions at any one earth terminal, at least two of the geostationary satellites are needed so that one will be available for transmission during a sun-dependent interruption of the other. In the simplest case one satellite is normally active and the other is available for use as a spare. For instance, an earth antenna normally directed to the eastern satellite is rapidly slewed westward to the second satellite at the onset of the sun-transit of the first satellite. If the satellites are spaced 8 degrees to avoid complications in transmission occurring when both satellites are interrupted simultaneously at easternmost and westernmost terminals and a representative 1 degree per second slewing drive motor is employed, the incidental interruption of service during the switching interval is 8 seconds. About 35 minutes later the onset of the sun-transit of the western satellite occurs and the earth antenna is slewed eastward back to the first satellite, inflicting another residual service outage of 8 seconds.

Such rapid slewing capability is an expensive addition to the earth terminal and the system still suffers two residual service outages lasting on the order of 8 seconds each. In addition, the satellitle handover produces transients and substantial instantaneous changes in propagation delay. These delays may, for example, adversely affect error checks and corrections in broadband, high-speed data transmission.

A variation of the spare satellite type of restoration may be provided by using a multidirectional antenna or two antennas at each earth terminal. In this manner, each terminal is simultaneously linked to both satellites carrying duplicate information and the large residual outage is eliminated. However, the switching transients and delay differences remain, and as in the slewing case, the system's maximum usable capacity is limited during the sun-transit to the capacity of one satellite.

Such switching techniques provide nearly continuous service during sun-transit, subject to the limitations of switching, but if eclipses of the two satellites overlap in time, system interruption is total unless backup batteries are used. Since during an eclipse a satellite without such backup is unavailable to any earth terminal, satellite diversity switching is inicapable of overcoming the overlapping eclipse outages. An 18-degree spatial separation of multiple geostationary satellites would prevent overlapping eclipses, but such a required spacing along the equator is too great to be commercially acceptable.

Complex hybrid terrestrial-satellite restoration can be used to increase the system's capacity during a sun-transit to more than the capability of one satellite. It involves rapid switching of available broadband terrestrial circuits to connect affected earth terminals with unaffected earth terminals so that additional satellite circuits can be provided to terminals being transitted. The sun-transit outage regions are, however, so large that restoration routes 500 miles or more in length are required. Furthermore, as the earth rotates and satellites revolve, each outage region moves rapidly across the contiguous United States so that the restoration configuration must be highly dynamic and requirements of geography and speed make such surface restoration of sun-transit outages unattractive. Such restoration cannot overcome satellite eclipses since the satellite is eclipsed for all earth terminals simultaneously.

Alternatively, a route diversity system could be designed in which each satellite provides dedicated channels to a small number of earth terminals. Prior to a sun-transit of the eastern satellite at the western terminal, the channels of the western satellite dedicated to a more eastern terminal are switched to the transitted terminal while the more eastern terminal is reimbursed with the channels of the eastern satellite temporarily unusable by the transitted western terminals. This method enables maximum use of the two satellites' total capacity, subject to the multiple residual outages, transients and propagation delay differences caused by the rapid switching affecting both satellites and both terminals simultaneously. Also, as the satellites progress eastward another equally involved rapid switch immediately prior to the transit of the western satellite is required. Additional limitations arise if the spacing between satellites and the spacing between earth terminals is so small that a sun-transit outage of each satellite occurs at both terminal stations simultaneously.

The established trend in satellite systems is toward more precise satellite station keeping in an attempt to minimize earth antenna tracking requirements and to increase orbit loading by reducing the required satellite spacing, but such rigid control is iself responsible for the distressing rapid and thorough serial succession of sun-transit service outages and eclipses of all satellites serving a mutually visible region of the earth. These outages can be overcome in the geostationary systems, but only at the cost of expensive equipment, inordinate system requirements and some degradation of service.

SUMMARY OF THE INVENTION

It is an object of the present invention to provide a reliable and economical satellite communication system in which service interruption caused by sun-transit is eliminated without the need for extensive terrestrial restoration or rapid switching at critical times.

It is also an object to provide a satellite system in which simultaneous eclipse service outage is eliminated without excessive satellite orbit separation.

In accordance with the invention, conventional satellites and ground terminal stations are used in a sun-synchronized space diversity system, arranged so that serial sun-dependent events do no occur. Geostationary orbits are not employed but rather satellites are placed in precisely oriented inclined circular earth-synchronous orbits so that each satellite follows a particular sidereal motion and appears to repetitively trace out a figure 8 projection on the surface of the earth. Serial sun-transits and eclipses are avoided by properly phasing the satellites on their respective figure 8's.

Satellite motions are sufficiently orderly and continuous to enable economical accommodation by earth antennas and minimal diversity switching. Each earth terminal antenna follows a satellite in its sidereal motion by use of a 24-hour sidereal cyclical cam drive included in the antenna mechanism. The system does not require rapid switching nor critical switching times as in geostationary systems.

The planes of circular earth-synchronous orbits for the two satellites are tilted slightly with respect to the earth's mean equatorial plane by small inclination angles. Appropriate angles of inclination depend upon system parameters, but for one idealized case of equal and opposite inclinations, the minimum required magnitudes range from about 2 degrees for avoiding serial sun-transits to about 9 degrees for complete avoidance of serial and simultaneous eclipses. The satellites are inserted into their respective orbits so that they have a specified phasing on their individual FIG. 8 patterns. If the minimum required inclinations are provided, this phasing will produce sufficient and properly timed separation of sun-synchronized diversity satellites to prevent serial sun-dependent outage events throughout the year. In addition to the inclined orbits and the satellite phasing, the orbits are oriented to maintain a prescribed orbit spacing between the mean longitudes of the satellites, thus avoiding radio interference.

In a representative two satellite sun-synchronized space diversity system, the satellites are phased so that when one is approaching its northernmost position along its FIG. 8 pattern, the other is approximately 12-hours behind, approaching its southernmost position of its FIG. 8 pattern. In this manner sun-transits of a first satellite will traverse the United States on successive days in the spring and fall season, causing sun-transit outages at terminals along its path, but the second satellite beings its sun-transit outages at these same terminals only after the last daily sun-transit of the first satellite. As a result, only a single spring and fall diversity switch of reception at each terminal from the second satellite to the first is necessary to ensure uninterrupted continuous service operation throughout the season of sun-dependent events. This seasonal diversity switch at a given terminal may be provided at any time between the last sun-transit of the first satellite and the first sun-transit of the second satellite at that terminal and need not occur at any specified time within that interval. Since switching time is not critical, such satellite handover may occur during periods of low transmission when fast switching is unnecessary and adverse effects of transients and propagation delay differences can be tolerated. Two antennas at the given earth terminal can be used to provide such satellite handover without significant residual service outage, and this too can occur at a time of low transmission. In addition to the seasonal diversity switches a recycling switch may be required in advance of each outage season.

The lack of serial events greatly simplifies and improves the switching of dedicated channels in systems designed to provide during sun-dependent events a capacity greater than that of one satellite. Also, since the switching involves only one transitted satellite at a time until it has completed its seasonal sun-transits, there will be no limitation on channel exchange due to satellite spacing as in geostationary systems.

Serial and concurrent eclipses can be avoided in the same way as serial sun-transits are avoided, but only if the orbital inclinations are sufficient, for example, 9 degrees for each orbit, so that the two satellites are never simultaneously eclipsed.

DETAILED DESCRIPTION

The sun-synchronized space diversity satellite system operates to eliminate serial sun-dependent events by utilizing specific orbital parameters and earth terminals having modest diversity switching capacity. Serial daily sun-transits are avoided and serial and concurrent eclipses are avoided or minimized throughout the year by the continuing automatic sun-synchronized space diversity resulting from very small fixed, unique sidereal motions imparted initially to a minimum of two satellites in precisely offset phase opposition.

Figure 1:
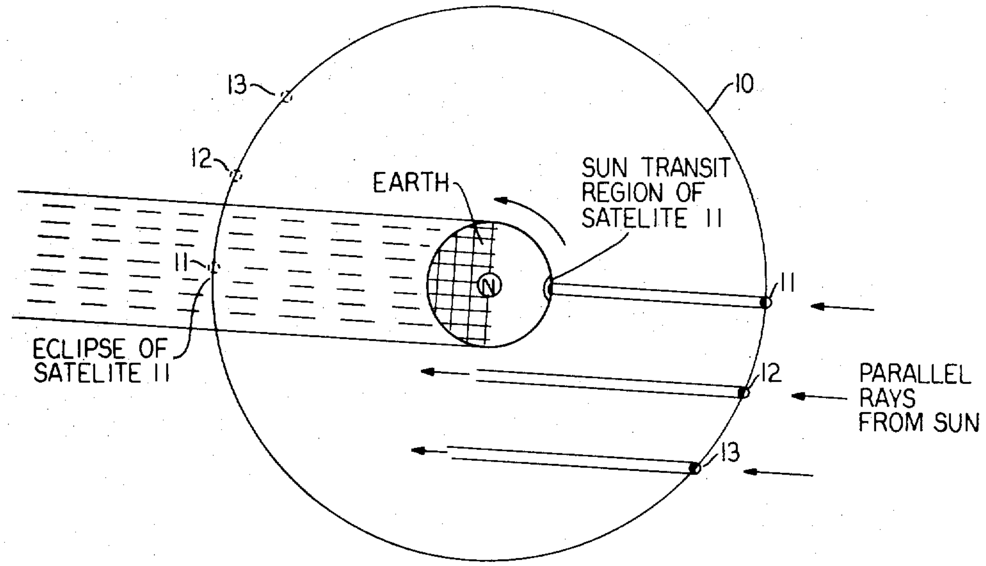
FIG. 1 PRIOR ART
FIG. 1 is a diagram of the geometry of sun-transits and eclipses of geostationary satellites.

The basic geometry of sun-transits and eclipses of geostationary satellites is illustrated in FIG. 1, in which the sun's rays are assumed to be parallel and refraction is neglected. As satellites 11, 12 and 13 proceed on equatorial orbit 10, their shadows traverse the earth in the centers of sun-transit regions from which signals from the satellite are obliterated by solar thermal noise. Conversely, when satellites 11, 12 and 13 pass behind the earth they are eclipsed by the earth.

Figure 2:
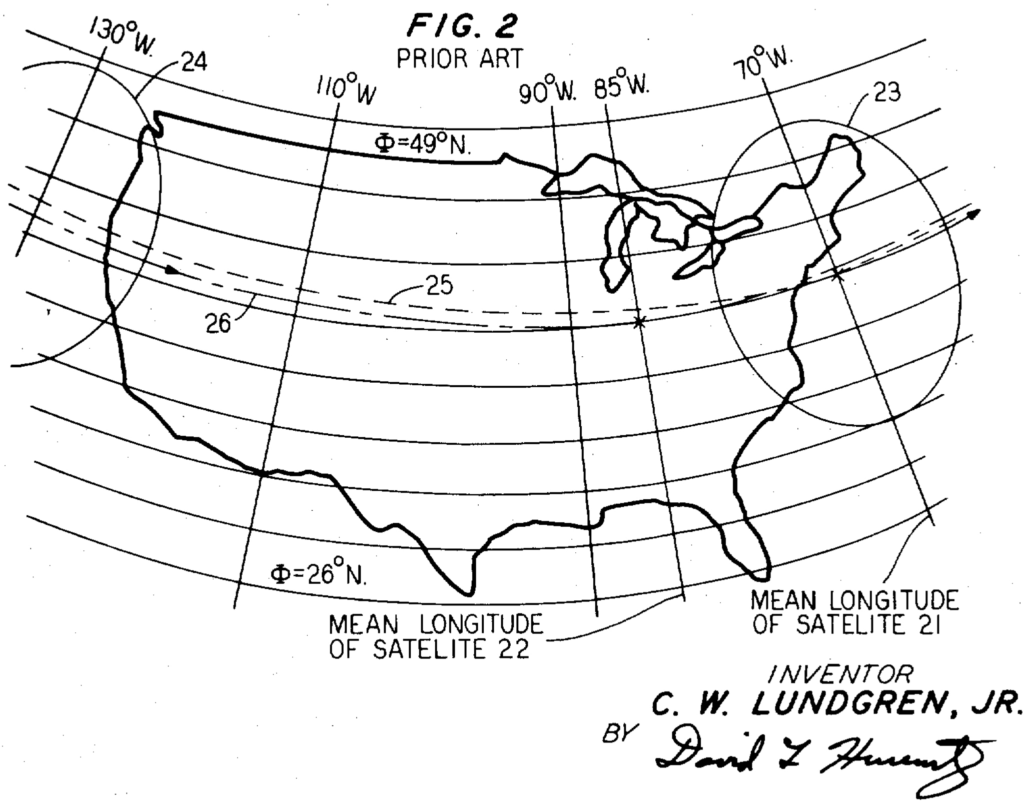
FIG. 2 PRIOR ART
FIG. 2 is a diagram illustrating the coverage and motions of sun-transit outage regions caused by two geostationary satellites.

FIG. 2 illustrates the paths of sun-transit outage regions 23 and 24 of geostationary satellites 21 and 22, respectively, having mean orbit longitudes spaced 15 degrees apart. Each path is tangent to the latitude $\Phi$ intercept of the satellite's shadow at apparent noon (sun-transit) at the satellite's mean orbit longitude projected radially on the earth, or mean subsatellite longitude. At all other longitudes in the northern hemisphere, the path lies slightly to the north of this minimum latitude.

In the spring short daily sun-transits begin to affect earth terminals situated in the northern latitudes of the coverage zone; for example, approximately $\Phi=49$ degrees north for a coverage zone defined by the contiguous United States. Two or three days later these terminals experience maximum daily outages lasting five minutes or more, depending upon down-path transmission parameters. After an additional two or three days, outages at these northern terminals will end, the outage paths and the minimum latitudes having progressed southward at a rate of about 3 degrees of latitude per day. Conversely, in the fall the daily outage paths progress from south to north. Thus, for the particular satellite transmission parameters and allowable signal deterioration each earth terminal is affected about 6 days, twice yearly, while coverage throughout the contiguous United States is affected about 14 days, twice yearly.

Sun-transit regions, such as 23 and 24, shown on their respective paths 25 and 26, designating, for example, the fourth day of the spring outage season, are approximately elliptical patterns, elongated north-south and centered about the shadow of their respective satellites 21 and 22. Based on earth-synchronous satellite revolutions and accounting for the earth's rotation, it is estimated that for satellites 21 and 22 spaced in orbit approximately 15 degrees apart, the elapsed clear interval free of any sun-transits of either satellite at any of the receiving earth terminals located throughout the contiguous United States is approximately 30 minutes. This defines a critical interval for switching between satellites, and while a combined terrestrial-satellite switching scheme may provide only very short residual transmission outages which are predictable, substantially greater operating time may be lost in anticipatory closures of many satellite circuits to prevent interrupted communications when the residual outages do occur. This will be true primarily where the duration and time of termination of customer usage is unknown as in the case of transmission of multiplexed public telephone message circuits.

Consecutive, serial eclipses of all geostationary satellites can be expected for about 90 evenings per year, in the spring and fall. Eclipses occur near local apparent midnight, referred to the time zone of each satellite's longitude, and unlike sun-transits they affect all terminals simultaneously. Eclipses range in duration from approximately 20 minutes to a maximum duration of about 70 minutes, the latter occurring approximately on the dates of the spring and fall equinoxes.

Figure 3:
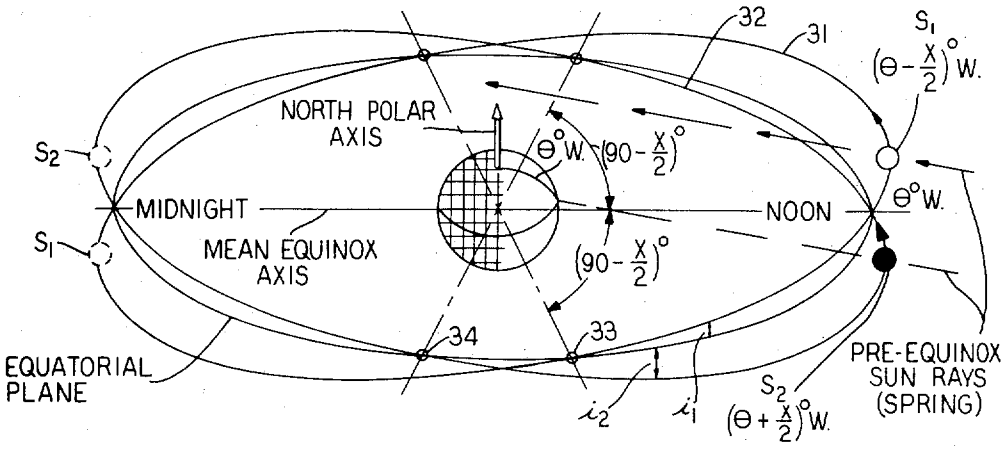
FIG. 3 is a diagram of circular earth-synchronous orbit of two satellites phased for sun diversity in accordance with the present invention.
Figure 4:
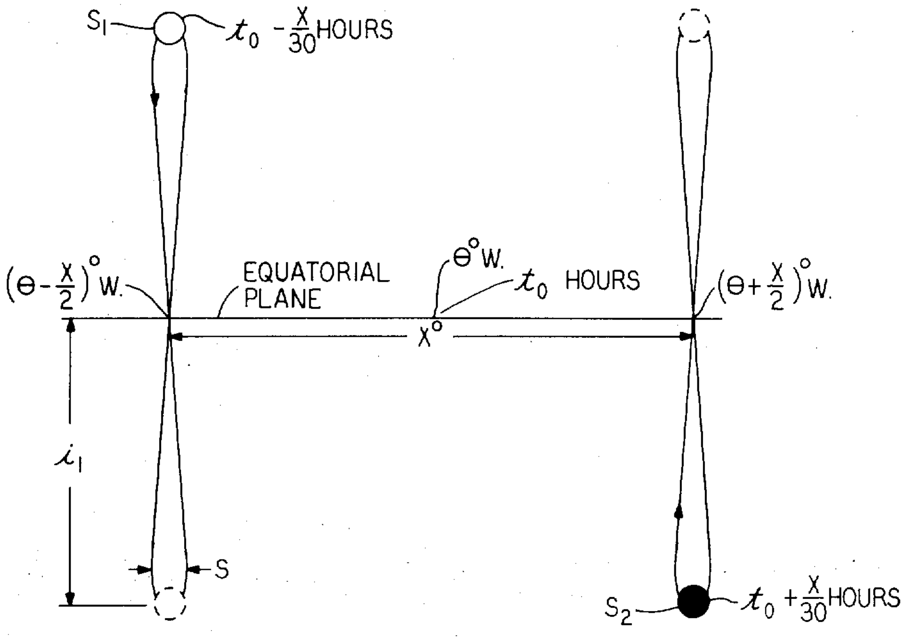
FIG. 4 is a diagram illustrating the sideral motions of the satellites of FIG. 3 as observed from an earth terminal.

The necessary satellite motions and the initial conditions for a sun-synchronized diversity satellite system having a minimum of two closely spaced near-equatorial inclined orbit synchronous satellites $S_1$, $S_2$ are illustrated in FIGS. 3 and 4.

The planes of circular earth-synchronous orbits 31 and 32 for the two satellites $S_1$ and $S_2$ are tilted slightly with respect to the earth's mean equatorial plane by small geocentric inclination angles $i_1$ and $i_2$, respectively, where $i_1$ and $i_2$ are in opposite senses relative to the equatorial plane. As each satellite is in an inclined orbit it exhibits a small sidereal motion in the form of a slender figure 8 pattern fixed at the satellite's mean longitude location along the familiar geostationary orbit when observed from an earth terminal. The appropriate values for orbital inclination angles $i_1$ and $i_2$ depend upon system transmission parameters, as is described below, but the minimum magnitudes for a preferred system serving the contiguous United States (i.e., between approximately 25 degrees and 50 degrees north latitude) range from about 2 degrees for avoiding serial sun-transits to about 9 degrees for complete avoidance of serial and concurrent eclipses. The 2 degree inclination will insure that within the contiguous United States no station will experience serial sun-transits and the same satellite will be out at every station suffering a sun-transit outage on any one day. Lesser inclinations on the order of one degree will avoid serial sun-transits, but different satellites may be out at different stations. This reduced orbital parameter will minimize launching and orbit keeping costs, but will lower tolerances for the required semi-annual switching and may complicate the organization of restoration processes.

Figure 5:
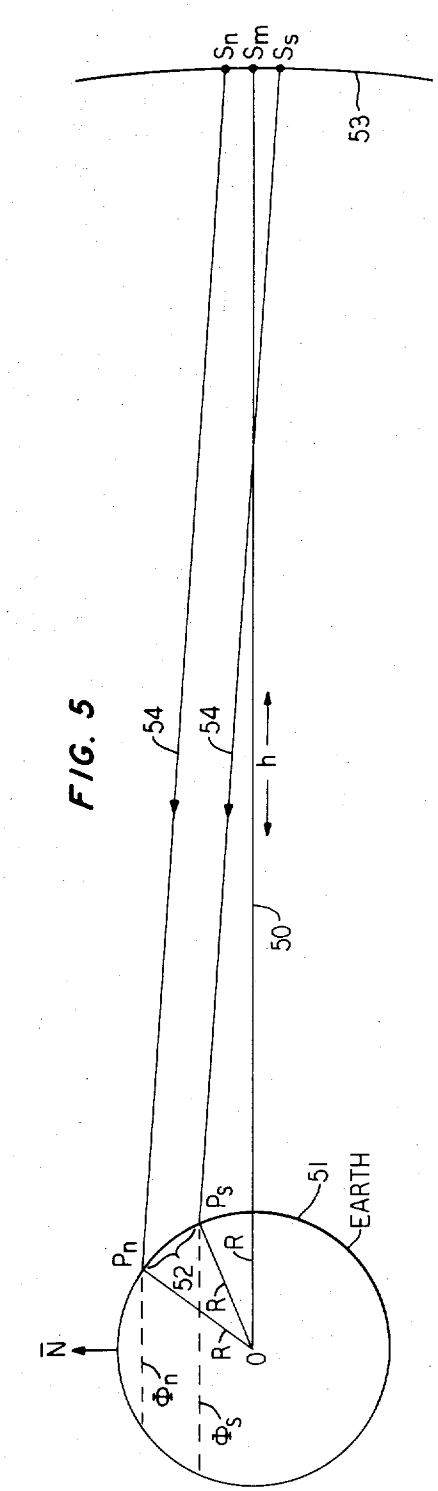
FIGS. 5 and 6 are geometric diagrams for determining minimum inclination angles in accordance with the invention.

An initial evaluation of the minimum angles of inclination required to avoid serial sun-dependent events may be made with reference to FIG. 5. The zone of coverage 52 desired for location of terminal sites is defined by its north and south latitude limits $\Phi_n$ and $\Phi_s$, respectively, and its east and west longitude limits. The sum of the orbital angular inclinations $i_1$ and $i_2$ is numerically equal to the geocentered angular measure between the extreme north and south excursions of the two satellites $S_n$ and $S_s$, respectively, on their sidereal motion figure 8 patterns.

Geostationary satellite $S_m$ is in the equatorial plane 50; satellite $S_n$, in an inclined circular earth-synchronous orbit, is at its northernmost excursion; and satellite $S_s$, also in an inclined circular earth-synchronous orbit, is at its southernmost excursion. It is assumed here that the sun is a point source, that earth antennas are ideal in the sense of possessing unlimited resolving power, and that all satellites share the same mean subsatellite longitude meridian 51 on the earth and that this common meridian passes through the center of the designed coverage zone 52. The three positions of $S_m$, $S_n$ and $S_s$ lie on a great circle 53 of a geocentered sphere of radius $R+h$, whose plane (the plane of the paper) contains the mean geopolar axis $\overline{N}$ and the assumed common subsatellite meridian 51, and where R is the radius of an assumed spherical earth and $h$ is the satellites' altitude.

The minimum required geocentered angular measure of north-south satellite excursion must be such that the shadow at local noon (solar time) along common meridian 51 caused by the satellite $S_n$ at its northernmost excursion falls on point $P_n$, the intersection of the northernmost latitude $\Phi_n$ of the coverage zone 52 and common subsatellite meridian 51, for any appropriate apparent declination of the sun's parallel rays 54 from a point source sun. Simultaneously, the shadow of the satellite $S_s$ falls on point $P_s$ at the corresponding southernmost latitude $\Phi_s$ of the coverage zone 52 along the common subsatellite meridian 51. As seen from FIG. 5, if the total inclination $i_1+i_2$ subtended between the two assumed circular earth-synchronous orbits corresponds to be geocentered angle of arc $$\widehat{S_nS_s}$$

appropriate orientation of these tilted orbits and appropriate phasing of the satellites in their orbits is capable of ensuring automatic space diversity during the spring and fall seasons against serial sun-transits by a point source sun for the above assumed ideal earth antennas within a zone defined by latitudes $\Phi_n$ and $\Phi_s$.

The sun is, however, not a point source, but is a disc source of thermal noise approximately 0.5 geocentric degrees in diameter. In addition, the appropriate solar noise power contours vary in shape and magnitude with time and frequency. Furthermore, earth antennas are not ideal, but due to inherent limitations of resolving power add to the minimum required displacement of the earth antenna's pointing angle from the sun. Hence, due to the apparent size of the sun, the solar noise power contour model and the limitations of practical antennas, the effective outage region in practice is not the intersection of a point shadow and the spherical earth as indicated in FIG. 5, but is, as illustrated in FIG. 6, approximately the intersection of the spherical earth and a conical figure of revolution such as 60 of angular radius $\alpha$ degrees about the satellite's shadow axis 61 having its apex at the satellite $S_n$ thus forming a nearly elliptical pattern 62 on the earth as mentioned above.

The corresponding allowable minimum angular displacement between the pointing angle from the earth terminal to the satellite and from the same earth terminal to the sun for acceptable reception will vary depending upon transmission parameters, but a range of 0.6 degree for larger antennas to greater than 1 degree for smaller antennas is appropriate, and assuming parallel sun rays, is assumed numerically equivalent to the angular radius $\alpha$ degrees of the outage cone 60.

Figure 6:
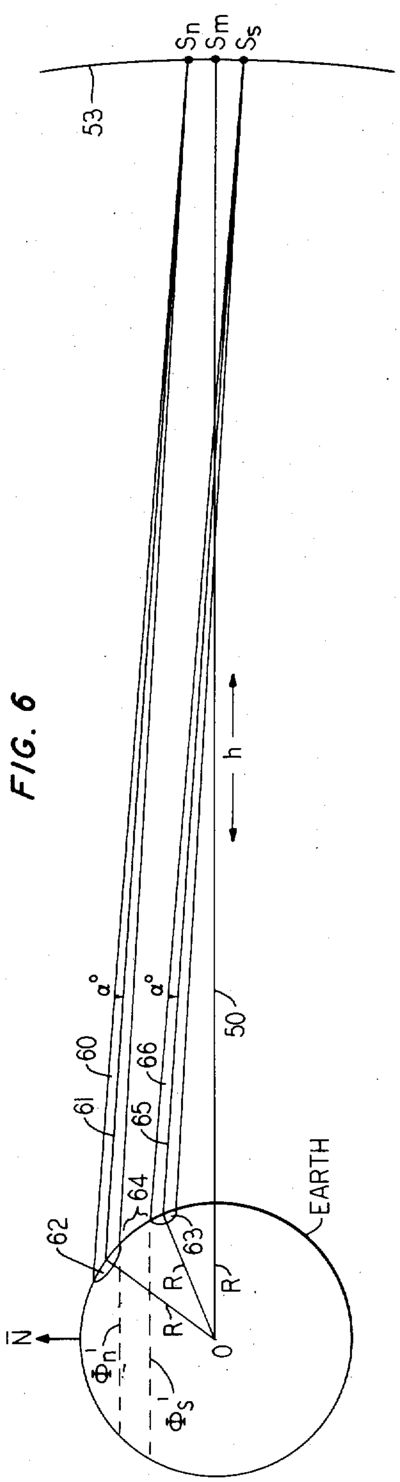

FIG. 6 also illustrates how the required angular diversity separation resulting from the satellites' sidereal excursions is determined by the boundaries of coverage zone 64 since the nearly elliptical shadows 62 and 63 of satellites at $S_n$ and $S_s$, respectively, must be tangent to the zone; the outage region 62 of $S_n$ being north of maximum latitude limit $\Phi_n'$ and the outage region 63 of $S_s$ being south of minimum latitude limit $\Phi_s'$. Parallel sun rays 61 and 65 are assumed and refraction is ignored as it is of negligible effect except for the extreme latitudes approaching 80 degrees north or south, but it may be accounted for by using the refraction correction techniques suggested for small earth antenna elevation angles by C. W. Lundgren and A. S. May in an article in the Bell System Technical Journal, vol. 48, No. 10, 1969, at page 3387.

Appropriate geometry will determine the required spatial displacement between the northernmost and southernmost excursions at $S_n$ and $S_s$ required to ensure that the conic intersections 62 and 63 of the appropriate outage figures of revolution 60 and 66 with the earth are tangent to the limiting latitude circles for the designed coverage zone. Furthermore, the outage regions move rapidly across the earth west to east and in practice the satellites will generally have different mean subsatellite longitudes resulting in different aspect angles for sun-transits observed at different earth terminals within the coverage zone. All of these factors contribute to an east-west time distribution of a small fraction of an hour for sun-transits of the same satellite observed at all earth terminals within the coverage zone. Hence, initial calculations based on a simple geometrical model accounting for earth rotation indicate that the satellites' sidereal excursions must be further separated by an additional fraction of a degree in order to ensure adequate diversity (no serial sun-transits) within the entire coverage zone. For a zone encompassing the contiguous United States and a system utilizing conventional transmission equipment, inclinations of substantially 2 degrees for both $i_1$ and $i_2$ are appropriate to avoid serial sun-transit outages. The equality of inclinations is illustrative and not mandatory, but it does simplify the system. As indicated above, lesser inclinations could yield an equivalent avoidance at each individual station within the zone.

Eclipses of two satellites occur concurrently when they are both within the earth's shadow, and eclipses occur serially when these both pass into the shadow on the same day. As can be seen from FIG. 1 to ensure that concurrent eclipses will never occur, geostationary satellites must be separated by a geocentric angle greater than that subtended by the intersection of the earth's shadow and a geocentered sphere having a radius equal to the orbit radius. The earth's shadow is frequently assumed to be a circular cylinder with a diameter equal to the mean diameter of the earth. This model neglects atmospheric refraction and diffraction and the distinction between umbra and penumbra. The minimum space diversity in geocentered angular measure necessary for avoiding concurrent and serial satellite eclipses assuming a cylindrical earth shadow is the maximum geocentric angle intercepted by the circle of diameter one mean earth diameter everywhere uniformly distant from the geocenter by one orbit radius, or approximately 18 degrees. Each minimum orbit inclination, where $i_1=i_2$, necessary for avoiding concurrent and serial eclipses is therefore approximately one-half of 18 or 9 degrees.

The minimum inclination only ensures sidereal excursion sufficient to allow appropriate orbit orientation and satellite phasing to eliminate the serial sun-dependent events. A working system must provide this orientation and phasing and simultaneously provide required spatial separation of the satellites to avoid radio interference.

For satellites operating in the same frequency bands, a minimum geocentered angular separation between satellites is specified according to maximum allowable interferences consistent with resolving powers of the earth antennas. This may be achived by prescribing an appropriate minimum satellite spacing $x$ degrees between mean orbit longitudes of two adjacent satellites. Referring again to FIG. 3 and to FIG. 4, a convenient running time reference adopted for describing the required motions is initial time $t_0$ mean solar hours, marking the advent of 12 o'clock mean noon (local apparent, or sun time) on the date of the spring equinox at longitude $\theta$ degrees west, the average of the two desired subsatellite earth longitudes selected for appropriate mean satellite stationkeeping above the geographical zone to be served. The mean orbit and subsatellite earth longitudes of satellites $S_1$ and $S_2$ therefore $$\Phi-\frac{X}{2} \text{ and } \Phi+\frac{X}{2}$$

degrees west, respectively.

Figure 8:
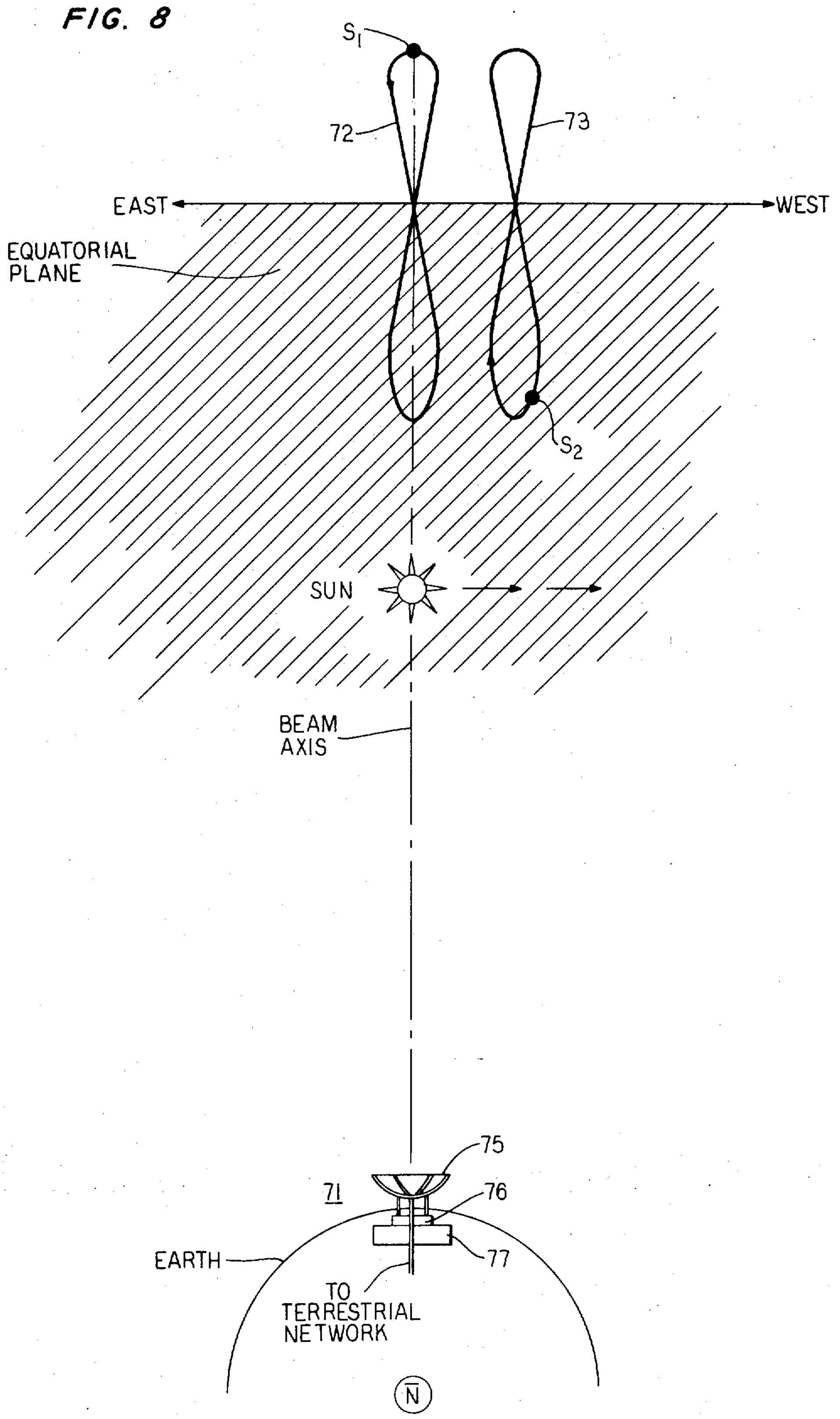
FIG. 8 is a diagram of two sun-synchronized diversity satellites as seen from an earth terminal in accordance with the invention.

Positioning of the figure 8's in accordance with these mean longitudes is accomplished by establishing the orbit planes in unique offset opposition as shown in FIG. 3 so that the intersections of each of the orbital planes with the earth's equatorial plane form acute angles of $(90-x/2)$ degrees symmetrically with the mean equinox axis, as measured in the equatorial plane. Other orbit plane orientations may be judiciously substituted to alter the mean satellite locations, or additional satellites may be placed in tandem in spaced figure 8 patterns by extrapolating the orbit orientation procedure described above in the appropriate longitude direction.

As seen from FIGS. 3 and 4, given orbit spacing $x$ degrees the required time of the ascending node 33 in orbits 31 for satellite $S_1$ (when the satellite $S_1$ crosses the center of the figure 8 toward northern excursion) is $t_0-(6+x/30)$ mean solar hours, so that the maximum excursion of satellite $S_1$ is made to occur one-quarter of a mean solar day, or 6 mean solar (civil) hours in this case, after the time of this ascending node, at the time $t_0-x/30$. This is shown as the upper limit of the excursion for the left-hand figure 8 pattern in FIG. 4. It is also noted that the semi-major axis of the figure 8 pattern for satellite $S_1$ in geocentered angular measure is equivalent numerically to the responsible orbit inclination $i_1$.

Similarly, the descending node 34 in orbit 32 for satellite $S_2$ is required to occur at time $t_0-(6-x/30)$ mean solar hours, in order for the subsatellite point for $S_2$ to assume its maximum south latitude at the time $t_0+x/30$ hours. Thus, where satellite $S_1$ is at a maximum northern excursion at time $$t_o-\frac{X}{30}$$

hours (local solar noon at west longitude $$\theta-\frac{X}{2}$$

degrees), satellite $S_2$ is approximately at its maximum southern excursion, though by intent it will actually reach its southern maximum later at the time $$t_o+\frac{X}{30}$$

hours (local solar noon at west longitude $$\theta+\frac{X}{2}$$

degrees) so as to provide the equivalent maximum desired spatial diversity for satellite $S_2$ at the appropriate time.

For the case specified above, coincidence is assumed between initial time $t_0$ hours and the spring equinox. An equivalent specification is referred to the fall equinox. Nearly exact coincidences between $t_0$ and either equinox permit the use of minimum orbital inclinations $i_1$ and $i_2$ for a given geographical zone of fixed latitude extent to be cleared of serial sun-transits or of serial or concurrent eclipses. For a given latitude span the largest orbit inclinations are required for coverage regions located along the equator.

FIG. 3 also illustrates the departure from such idealized symmetries when the desired satellite coverage region lies entirely in the northern hemisphere. Here, sun-transits affecting the coverage region are experienced somewhat prior to the spring equinox, as illustrated, and again after the fall equinox, due to the necessary southern declination of solar radiation. Offsets of approximately two weeks are representative for the contiguous United States. Conversely, dates for observed satellite eclipse events are independent of latitude offsets of the coverage region from the equator.

For given orbit inclinations $i_1$ and $i_2$, such time offsets from exact equinoxes arising from coverage zone latitude assymmetry results in only a very small deterioration of that desired space diversity realizable at the equator. Since a fairly board function of time is involved, the exact date near either equinox associated with $t_0$ is not critical in terms of diversity efficiency. Furthermore, inspection of FIG. 4 reveals that the association, for a given date, of $t_0$ with sun-transit of the assumed mean meridian $\theta$ degrees west is not unduly critical, since the resulting satellite diversity separation is also very near maximum for a substantial interval before and after actual meridian transit. This latter tolerance is especially significant when the longitude span of the coverage zone is large so that sun-transits of the same satellite are spread out in time (east-west) among the earth terminals due to differences in the apparent positions of the satellite and sun slightly as observed from the different terminals. Conversely, the diversity performance is intentionally made to be nearly independent of the assumed satellite spacing $x$ by the precise phasing of satellites in their appropriately oriented orbits so that maximum latitude excursion of each satellite occurs at sun-transit of the zenith at its subsatellite meridian.

Figure 7:
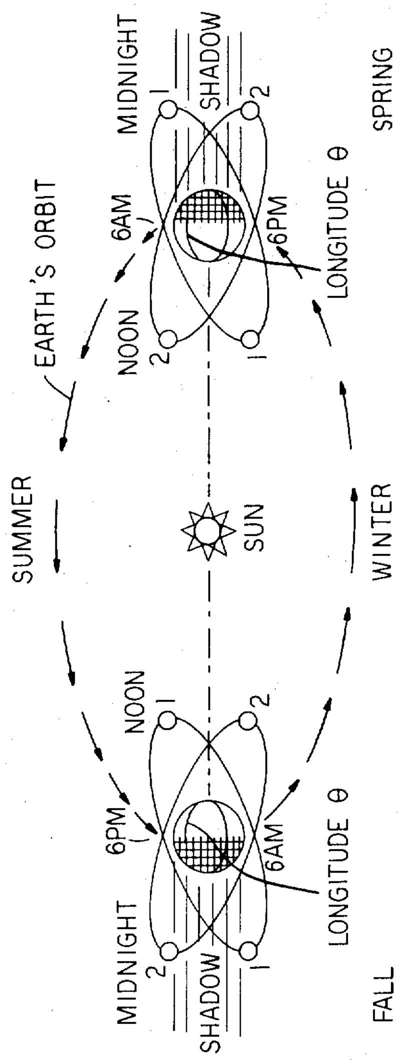
FIG. 7 is a diagram illustrating the satellites of FIG. 3 with respect to the sun and the seasons.

By synchronizing the satellite motions and timing with respect to the earth's revolution about the sun as is prescribed above, the required space diversity is automatically obtained during both spring and fall outage seasons, for an undisturbed idealized system of inertial orbits as shown in FIG. 7. Orbit corrections and adjustments after proper injection are not required in the ideal application, since all orbital angular momenta are conserved. To the first order, then, satellite postinjection propulsion and ground-control equipment complexities, reliabilities, and costs including spacecraft on-board fuel consumption, orbited payload weights and hence, satellite lifetimes are comparable to those determined for equivalent geostationary satellite couterparts. This assumes that the mean orbit longitude stationkeeping is continuously preserved to a precision achievable by the geostationary satellites.

While satellite motions and timing are specified above in terms of initial conditions at time $t_0$ coincident with the spring (or fall) equinox, actual satellite launching is not restricted to any season, provided that final deployment and satellite motions coincide with those for the specified systems at any time chosen for injection. To the first order, per-satellite launching costs including the timing (season, day, hour) and all procedures and fuel necessary for deployment of either the sun-synchronized diversity multisatellite system or a comparable geostationary system are equivalent, except to account for the slight deliberate orbit inclinations of zero average value throughout the system. Note also that the maximum difference between corresponding final orbit longitudes for the two systems does not exceed the semiwidth S of the thin sidereal patterns shown in FIG. 4.

Costly multiple-antenna earth terminal complexes, multifeed antennas, or rapid antenna slewing capabilities required for hybrid geostationary satellite-terrestrial restoration schemes are unnecessary for the sun-synchronized diversity satellites since there is no rapid switching of receiving terminals between the satellites. It is assumed that all earth antennas selected for uninterrupted reception during sun-transit periods are pointed continuously at unaffected diversity satellites throughout each day; the actual timing of the single mid-outage season anticipatory redirection of these antennas from previously unaffected satellites to the prospectively unaffected satellites is unimportant and can be different for the convenience of each earth terminal. It is anticipated that such switching will occur at off-peak or low transmission periods.

FIG. 8 is a representation of one terminal station 71 in a coverage zone in the northern hemisphere of the earth and two diversity satellites $S_1$ and $S_2$ on their respective FIG. 8 loci 72 and 73 at solar noon at the mean longitude of $S_1$. At terminal 71 the decreasing southern declination of the sun's rays causes the sun to appear to move gradually from the southern sky to the northern sky in the spring so that terminal 71 first suffers sun-transits of satellite $S_2$ until the outage regions for satellite $S_2$ pass southward of the latitude of terminal 71. Then the terminal suffers the sun-transits of satellite $S_1$. In the fall, the apparent declination of the sun proceeds from north to south, creating south-to-north progressions of outage regions of first satellite $S_1$ and then satellite $S_2$.

Terminal 71 comprises a single antenna 75 mounted to a 24-hour sidereal cyclical cam drive 76 which imparts appropriate motion to the antenna to enable its main beam axis to follow the sidereal motion of one of the satellites, such as $S_1$. In the simplest embodiment, only one satellite is linked to the terrestrial network by means of radio contact with station 71 at a time, and if antenna 75 is following satellite $S_1$, it will be slewed by a conventional slewing motor 77 to satellite $S_2$ after the last outage of satellite $S_2$ and prior to the onset of the first outage of satellite $S_1$. This will create one transmission hit due to the residual outage during slewing, but the hit occurs only once an outage season and can take place during a period of low transmission. A more extensive station could provide an individual antenna for each satellite and thus avoid the slewing outage.

For the minimum-inclination diversity phased system described, the earth terminal antennas need follow only slow, very small and continuous sidereal satellite motions. These orderly, repeated motions can be accommodated automatically and reliably by conventional 24-hour sidereal cyclic cam drives. The actual period required for the proposed sidereal motions is $23^h56^m\ 4.09054^s$ in mean solar (civil) time measure. Costs and maintenance for such antenna drives are virtually insignificant compared with those for full automatic-tracking facilities. Hence, cyclic drives are appropriate for a large deployment of small earth antennas requiring moderate beam-pointing precision, such as for inexpensive area reception of television signals, while fully automatic tracking is appropriate and costs are proportionally less significant for the smaller number of large expensive antennas requiring precise beam pointing.

Slight deviations from the apparent perpendicularity between the equatorial plane and the major axis of the sidereal figure 8 pattern accompanies very large combined longitude and latitude distances between an earth terminal and a mean subsatellite point. However, the maximum deviation is limited, by constraints of satellite radio visibility, to about 0.7 degree and the cam axis may be offset from its normal alignment parallel to the geopolar axis by an appropriate rotation about the terminal-satellite axis by slightly less than 0.7 degree to accommodate for such a deviation.

While only two satellites are required for the diversity phase system, it is apparent that larger systems can be employed in a similar steady state configuration to obtain the necessary space diversity. In contrast with schemes involving terrestrial restoration and/or carefully timed switches between geostationary satellites, for which orbit longitudes are carefully selected and maintained, the phased satellites may be placed at will in orbit longitude without degrading system performance significantly. Thus, a high degree of system flexibility is retained. Furthermore, entire orbit longitude allocations may be loaded with nearly equally effective satellites continuously maintained at minimum interference-limited orbit spacings, thus contributing to easy system growth.

The obvious system growth amounts to adding uniformly spaced, alternately phased satellites along the orbit longitude allocation in the sense of repetitious extension of the system shown in FIG. 3. Conversely, more efficient use of orbit longitude is derived from judicious incorporation of orbit-loading techniques suggested by Rowe and Penzias in an article in the Bell System Technical Journal, vol. 47, No. 10, 1968 at page 2379, involving large multisatellite figure 8 patterns. For orbit inclinations of approximately 30 degrees and 1-degree minimum satellite separation, a loading improvement factor of nearly six is reported. However, full antenna tracking capabilities are likely to be necessary for both earth terminals and satellites for such large orbit inclinations.

A slow maximum rate-of-change of the difference in total one-way path delay between adjacent satellites of a few-tenths microsecond per second is estimated from Doppler frequency shifts. This occurs when the satellites simultaneously approach the equatorial plane symmetrically from both sides. Such small Doppler rates are not likely to aggravate the effects of an otherwise prescribed maximum radio interference between adjacent satellites spaced $x$ degrees.

Restoration problems in broadband data transmission associated with large differences in propagation delay between switched circuits (terrestrial and/or geostationary satellite) are avoided if the proposed space-segment diversity system alone is employed. The need for rapid, active handovers of earth terminals between satellites is largely eliminated through the flexibility afforded by infrequency and noncritical timing.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A satellite communication system comprising two satellites each in an earth synchronous orbit inclined to the equatorial plane, at least one earth terminal in radio visibility of both of said two satellites, said terminal including means for making radio contact with at least one of said satellites, said satellites being phased on their orbits such that during any one day said terminal is within a sun-dependent outage region of no more than one of said satellites, switching means associated with said earth terminal for switching radio contact between said two satellites after the passage of the outage region of one satellite at said terminal and before the onset of the outage region of the other satellite at said terminal.

2. A satellite communication system as claimed in claim 1 wherein said terminal includes an antenna and means for continuously pointing said antenna at one of said satellites as it traces out a sidereal figure 8 pattern.

3. A satellite communication system as claimed in claim 2 wherein said means for pointing is a 24-hour sidereal cyclical cam drive mounted to said antenna.

4. A satellite communication system as claimed in claim 2 wherein said switching means is a motor for slewing said antenna from one satellite to the other satellite.

5. A satellite communication system as claimed in claim 1 wherein said two satellites are phased substantially 12 hours apart on their respective sidereal figure 8 patterns and so that maximum excursions of both satellites occur on their respective figure 8 patterns at substantially at solar noon and midnight at the mean longitudes of each of said two satellites, respectively.

6. A satellite communication system as claimed in claim 5 wherein said terminal is located between approximately 25° and 50° latitude, and said orbits are each inclined to the equatorial plane by at least 2 degrees in opposite senses whereby serial sun-transit outages of said two satellites do not occur at said terminal.

7. A satellite communication system as claimed in claim 5 wherein said terminal is located between approximately 25° and 50° latitude, and said orbits are each inclined to the equatorial plane by at least 9 degrees in opposite senses whereby serial sun-transit and serial and concurrent eclipse outages of said two satellites do not occur at said terminal.

8. An earth orbiting diversity satellite communication system for avoiding serial sun-transits comprising, a first communication satellite in synchronous orbit about the earth, a second communication satellite in synchronous orbit about the earth, an earth terminal on the surface of the earth in radio visibility at all times of both said first and said second satellites, and means for communicating between said terminal and either of said satellites, said first and second satellites being in individual orbits inclined to one another by a first small angle, each orbit being inclined to the equatorial plane of the earth by a second small angle, such that the subsatellite point of said first satellite repetitively traces out on the surface of the earth a first figure 8 crossing the equator at a first longitude and the subsatellite point of said second satellite repetitively traces out on the surface of the earth a second figure 8 crossing the equator at a second longitude, said first and said second satellites being phased on their respective orbits such that when the sun is over the average of said first and said second longitudes one of said satellites approaches the maximum excursion above the equatorial plane and the other of said satellites approaches the maximum excursion below the equatorial plane.

9. A method of earth satellite operation to avoid serial sun-transits comprising the steps of, orbiting a first satellite in a synchronous orbit about the earth, said orbit being inclined to the eqautorial plane by a small angle such that the subsatellite point of said first satellite traces out on the surface of the earth a first figure 8 crossing the equator at a first longitude; orbiting a second satellite in a synchronous orbit about the earth, said second orbit being inclined to the equatorial plane by a small angle such that the subsatellite point of said second satellite traces out on the surface of the earth a second figure 8 crossing the equator at a second longitude; and phasing said first and said second satellites such that when the sun is over a longitude midway between said first and said second longitudes one of said satellites approaches the maximum excursion above the equatorial plane and the other of said satellites approaches the maximum excursion below the equatorial plane.

10. A satellite communication system as claimed in claim 5 wherein said terminal is located between approximately 25 degrees and 50 degrees latitude, and said orbits are inclined to the equatorial plane by at least the geocentrically measured radius of the sun in opposite senses, whereby serial sun-transit outages of said two satellites do not occur at said terminal.

References Cited

UNITED STATES PATENTS

| | | | |
|---|---|---|---|
| 3,163,820 | 12/1964 | Hight | 325—4 |
| 3,243,706 | 3/1966 | Grisham | 325—4 |
| 3,497,807 | 2/1970 | Newton | 325—4 |

OTHER REFERENCES

Extral-Terrestrial Relays Wireless World, October 1945, by Arthur C. Clarke, 305–308.

BENEDICT V. SAFOUREK, Primary Examiner

B. LEIBOWITZ, Assistant Examiner

U.S. Cl. X.R.

325—65; 343—100 ST